(12) United States Patent
Tudorache

(10) Patent No.: US 10,745,275 B2
(45) Date of Patent: Aug. 18, 2020

(54) APPARATUS FOR ENDOTHERMIC PROCESS WITH IMPROVED TUBES ARRANGEMENT

(71) Applicant: L'Air Liquide, Societe Anonyme pour l'Etude et l'Exploitation des Procedes Georges Claude, Paris (FR)

(72) Inventor: Diana Tudorache, Bures sur Yvette (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 94 days.

(21) Appl. No.: 16/322,670

(22) PCT Filed: Jul. 12, 2017

(86) PCT No.: PCT/EP2017/067625
§ 371 (c)(1),
(2) Date: Feb. 1, 2019

(87) PCT Pub. No.: WO2018/024455
PCT Pub. Date: Feb. 8, 2018

(65) Prior Publication Data
US 2019/0169025 A1 Jun. 6, 2019

(30) Foreign Application Priority Data
Aug. 2, 2016 (EP) .................................. 16306000

(51) Int. Cl.
*C01B 3/38* (2006.01)
*F23C 5/08* (2006.01)
(Continued)

(52) U.S. Cl.
CPC ............... *C01B 3/384* (2013.01); *B01J 8/062* (2013.01); *B01J 8/065* (2013.01); *F23C 5/08* (2013.01);
(Continued)

(58) Field of Classification Search
CPC ....................................................... C01B 3/384
See application file for complete search history.

(56) References Cited

U.S. PATENT DOCUMENTS

| 2011/0220847 | A1* | 9/2011 | Hendershot | ............. F23D 14/84 252/373 |
| 2015/0217250 | A1* | 8/2015 | Cances | ..................... F23C 5/08 252/373 |

FOREIGN PATENT DOCUMENTS

| EP | 1 193 219 | 4/2002 |
| EP | 2 708 812 | 3/2014 |

(Continued)

OTHER PUBLICATIONS

International Search Report and Written Opinion for PCT/EP2017/067625 dated Oct. 11, 2017.
(Continued)

*Primary Examiner* — Douglas B Call
(74) *Attorney, Agent, or Firm* — Justin K. Murray

(57) ABSTRACT

A furnace for performing an endothermic process, comprising tubes containing a catalyst for converting a gaseous feed, wherein tubes are positioned in rows inside the furnace, wherein burners are mounted between the tubes and between the tubes and the furnace walls parallel to the tubes rows, and wherein the burners rows and the tubes rows are ended by end walls and are divided into sections with, on each row of tubes, the distance from a wall end tube to the end wall being T2W, the distance between two adjacent inner tubes in a section being T2T, and the distance between two symmetry end tubes of two adjacent sections being T2S, wherein the
(Continued)

Top fired

Bottom fired

Side fired

Terrace wall tubes in the rows are arranged in such a way that the ratios T2T/T2W and T2T/T2S are greater than 0.5 and smaller than 2 thus limiting the differences in the heat transfer to the outer tubes (wall end tubes and symmetry end tubes) with respect to the inner tubes and reducing the temperature difference between outer tubes and inner tubes.

13 Claims, 10 Drawing Sheets

(51) Int. Cl.
  *B01J 8/06* (2006.01)
  *F23C 13/02* (2006.01)
  *F23C 13/00* (2006.01)

(52) U.S. Cl.
  CPC .............. *F23C 13/00* (2013.01); *F23C 13/02* (2013.01); *B01J 2208/00504* (2013.01); *B01J 2208/021* (2013.01); *B01J 2208/065* (2013.01); *C01B 2203/0233* (2013.01); *C01B 2203/0816* (2013.01); *C01B 2203/1241* (2013.01); *C01B 2203/141* (2013.01); *F23C 2900/03002* (2013.01)

(56) References Cited

FOREIGN PATENT DOCUMENTS

| EP | 3 182 003 | 6/2017 |
| WO | WO2014040815 | * 3/2014 |

OTHER PUBLICATIONS

EP Search Report and Written Opinion for EP 16 30 6000, dated Jan. 11, 2017.

* cited by examiner

| Tube number per bay | T2T | T2S | T2T/T2S | Relative duty [%] |
|---|---|---|---|---|
| 17 | 300 | 1400 | 0.21 | 2.96% |
| 18 | 300 | 800 | 0.38 | 2.48% |
| 17 | 300 | 800 | 0.38 | 2.54% |
| 15 | 300 | 400 | 0.75 | 1.70% |
| 16 | 300 | 300 | 1.00 | -0.11% |

| Tube number per bay | T2T | T2W | T2T/T2W | Relative duty [%] |
|---|---|---|---|---|
| 16 | 350 | 520 | 0.67 | 1.65% |
| 15 | 300 | 390 | 0.77 | 1.20% |
| 16 | 300 | 375 | 0.80 | 1.31% |
| 16 | 350 | 350 | 1.00 | 1.31% |
| 16 | 350 | 150 | 2.33 | -3.21% |

Figure 10

APPARATUS FOR ENDOTHERMIC
PROCESS WITH IMPROVED TUBES
ARRANGEMENT

CROSS REFERENCE TO RELATED
APPLICATIONS

This application is a § 371 of International PCT Application PCT/EP2017/067625, filed Jul. 12, 2017, which claims the benefit of EP16306000.7, filed Aug. 2, 2016, both of which are herein incorporated by reference in their entireties.

FIELD OF THE INVENTION

The present invention relates to the design of top-fired or bottom-fired furnaces for steam methane reforming (SMR) and other endothermic reactions like hydrocarbon feedstock cracking in externally fired reactors.

Although the following description will refer only to the SMR process, it applies as well to the other processes that utilize the same type of reactors.

BACKGROUND OF THE INVENTION

The SMR process is mainly based on the reforming reaction of light hydrocarbons such as methane that yields to a mixture of hydrogen ($H_2$) and carbon monoxide (CO) in the presence of water vapor. The main reaction is endothermic and slow and requires additional heat input, as well as a catalyst to occur. Usually, SMR reactor performances are limited by the heat transfer and not by the kinetic of the reactions.

In industrial practice, the SMR reactor usually comprises tubes placed in a furnace, said tubes being filled with catalyst, most often in the form of pellet, and fed with the process gas mixture (usually methane and steam).

Several well-proven configurations are available for furnace design as illustrated by the FIG. 1 which presents top fired (also known as down fired), bottom fired (also known as up fired), side fired, and terrace wall.

The top-fired technology is one of the most referenced designs and it is proposed by several technology providers. Top-fired furnaces are typically made of a refractory lined firebox containing several rows of catalyst containing tubes. The necessary heat for the endothermic reaction to occur is provided by roof burners placed in rows between the tubes, and also by rows of additional roof burners at the furnace side, along the walls of the furnace. The combustion products out of the burners are usually blown vertically downwards, so that the tube rows face the flames in their upper part. A flue gases exhaust collector is usually provided at the furnace floor level.

The bottom fired technology is less common in modern plants. According to the bottom fired technology, the burners are arranged in row on the floor of the firing area between the tube rows and fire vertically upwards.

The main objective of the furnace design (also called firebox design) is to maximize the heat transferred from the burners to the tubes—from the burner flames and also from the walls and the hot flue gas while respecting a tube maximal operating temperature constraint. The tube maximal operating temperature or MOT (also known as maximal operating constraint or MOT) is a function of several factors, and particularly of the tube mechanical load (mainly feed gas pressure), of the mechanical properties of the alloys used for the tubes and of the desired lifetime of the tubes exposed to creep and thermal aging.

Any intensification of the heat transferred to the tubes has a direct positive impact, either by increasing the productivity or by improving the compactness of the firebox which is valuable in terms of capital expenditures. However, intensification of the heat transferred usually implies higher tube skin temperature levels that reduce tube lifetime or require use of more resistant alloys, which are much more expensive.

Lack of homogeneity in the heat duty distribution in the furnace will lead some of the tubes to be hotter than other ones; temperature profiles of tubes are therefore critical elements for the design of the furnace and during operation. Tube temperature profiles provide decisive information when looking for good compromise between performance and durability, a good compromise being actually essential.

During operations, the performances of the furnace are therefore limited by the temperature of the hottest tube; it should not be hotter than the MOT. In the meantime, the process performance i.e. the productivity depends on the average tubes heat flux and temperatures. Therefore, the smaller is the difference between the hottest tube temperature and the average tube temperature; the better is the furnace performance.

Seeking for simplicity, most of the explanations that follow are made with regards to a top fired furnace. However, it is to be noted that figures and explanations with regards to a bottom fired furnace would be comparable.

In such a top fired furnace, as shown on FIG. 2, the catalyst containing tubes are arranged in rows within the furnace. The feed is supplied through the top part of the tubes; the synthesis gas produced—containing hydrogen and carbon monoxide as major components, and several minor components and traces—is withdrawn at the bottom part of the tubes. Burners are arranged in rows between the tubes rows and between tubes and walls. Resulting flue gases are extracted through exhaust tunnels.

FIG. 3 presents a top view of the same top-fired furnace showing 8 rows of 48 tubes each row being organized in 3 sections (bays) of 16 tubes each—and 9 rows of 15 burners arranged as well in 3 sections (bays) containing 5 burners each, and parallel to the tubes rows. The rows of burners are ended by a wall (wall along Y axis also identified as "end walls"). For all rows of tubes, the end tubes facing the end wall are identified as "wall end tubes".

For each row of tubes or burners, the high number of tubes and/or burners in each row induces geometrical constraints in the furnace that makes it necessary to add support beams to ensure safety of the furnace; said supports therefore divide the rows of tubes and the rows of burners as well in several sections (also known as bays) periodically repeated. Each section end either by an end wall or by a symmetry plane—plane that is in middle of the space left between two adjacent sections to allow the installation of the supports. The end tubes closest to the symmetry planes are identified as "symmetry end tubes" or "symmetry tubes".

The expressions "outer section tubes" or "outer tubes" refer to "wall end tubes" and "symmetry end tubes" without making a distinction between them.

All tubes that are not "wall end tubes" or "symmetry tubes" are identified as "inner section tubes" or "inner tubes".

The presence of the end walls close to the "wall end tubes" and the division of the tubes rows in sections—therefore creating a different space between two particular adjacent tubes—lead to inhomogeneous repartition of the available heat between the "wall end tubes", the "symmetry end tubes" and the "inner tubes".

In all the description the expression "row of burners" is to be understood as "row of burners parallel to the tube rows", this direction of the rows being also identified as X axis.

In the furnaces to which the invention applies, i.e. with burners placed in rows parallels to the tube rows, for each burner the direction of the flame jet created by the burner is affected by:
  the interaction with nearby co flowing jets, and
  the presence of wall (if any) that could also lead to an inhomogeneous repartition of the heat among the tubes belonging to the same row.

Inhomogeneity of heat distribution among tubes within a row that comes from the flame jets interaction within a row of burners parallel to the tube rows (along X-axis) has previously been considered; a solution has been found and disclosed in U.S. Pub. 2018/0372310 that solves the problem of over (or under) heating of tubes that comes from the repartition of the burners within the row of burners adjacent to the tube row. This type of in homogeneity of heat distribution among tubes is therefore not considered in this invention.

However, there remains a problem of inhomogeneity of heat distribution that concerns mainly outer section tubes and is not solved by the above cited patent application.

SUMMARY OF THE INVENTION

Certain embodiments of invention aim at focusing on the behavior of the tubes forming rows along X-axis and aim at improving it; more specifically certain embodiments of the invention aim at bringing a solution to the lack of homogeneity in the heating of the wall end tubes, symmetry end tubes and inner tubes along a row, due to the influence of the end walls and the gap between sections on the tubes, independently from a wrong design of the burners or an improper operation of the same.

Certain embodiments of the present invention propose to achieve said aims thanks to a furnace and a method to design this furnace which will avoid the problem of overheating of the outer tubes, by means of an optimized arrangement of the tubes along the burner rows.

It is therefore an object of certain embodiments of the invention to propose a furnace for performing an endothermic process, comprising tubes containing a catalyst for converting a gaseous feed, wherein tubes are positioned in rows inside the furnace, wherein burners are mounted between the tubes and between the tubes and the furnace walls parallel to the tubes rows, and wherein the burners rows and the tubes rows are ended by end walls and are divided into sections with, on each row of tubes, the distance from a wall end tube to the end wall being T2W, the distance between two adjacent inner tubes in a section being T2T, and the distance between two symmetry end tubes of two adjacent sections being T2S, characterized in that the tubes in the rows are arranged in such a way that the ratios T2T/T2W and T2T/T2S are greater than 0.5 and smaller than 2 thus limiting the differences in the heat transfer to the outer tubes (wall end tubes and symmetry end tubes) with respect to the inner tubes and reducing the temperature difference between outer tubes and inner tubes.

Preferred embodiments are presented hereafter:

In a preferred furnace of the invention, the ratios T2T/T2W and T2T/T2S are greater than 0.75 and smaller than 1.75 thus leading to improved reduction of the tube temperature difference between outer and inner tubes.

Preferably, T2T/T2W and T2T/T2S are equals, and they are greater than 0.75 and smaller than 1.75.

The invention is particularly suitable for furnace with burners mounted to the furnace roof.

According to another embodiment, burners are mounted to the floor and fire vertically upward.

The reformer of the invention is advantageously a steam methane reformer furnace.

According to another aspect, the invention relates to an endothermic process to be performed in a furnace comprising tubes and burners, said process comprising:
introducing gaseous feed and steam into tubes containing a catalyst for converting the gaseous feed, wherein tubes are positioned in rows inside the furnace,
combusting fuel with air in burners that are mounted between the tubes and between the tubes and the furnace walls that are parallel to the tubes rows
discharging products generated in the tubes,
wherein the burners rows and the tube rows are ended by end walls and are divided into sections with the distance from the wall end burners and the end wall being T2W, the distance between two adjacent tubes in a section being T2T, and the distance between two symmetry end tubes of two adjacent sections being T2S, characterized in that the tubes in the rows are arranged in such a way that the ratios T2T/T2W and T2T/T2S are greater than 0.5 and smaller than 2 thus limiting the differences in the heat transfer to the outer tubes (wall end tubes and symmetry end tubes) with respect to the inner tubes and reducing the temperature difference between outer tubes and inner tubes.

In addition, the process of the invention can be—taken alone or in combination:
a process for steam methane reforming.
a process where the ratios T2T/T2W and T2T/T2S are greater than 0.75 and smaller than 1.75.
a process according to claim 9 where the ratios T2T/T2W and T2T/T2S are equals.
a process according to claims 7 to 10 wherein the furnace is a top fired furnace.
a process according to claims 7 to 10 wherein the furnace is a bottom fired furnace.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims the way in which said claims refer back to one another.

The furnace of certain embodiments of the present invention and its advantages will be described in more detail in the following examples and on the basis of the drawings, where:

FIG. 10 presents a table with the results and analysis of simulations applied to a range of representative bays.

DETAILED DESCRIPTION OF THE INVENTION

Wall end tubes and symmetry tubes have a higher view factors with the end walls when compared to their nearest inner tubes neighbors (the view factor of a surface (i) with a surface (j) is defined as the fraction of the radiation leaving the surface (i) that is intercepted by the surface (j)). A higher angular sector of the end tubes are exposed to the end walls when compared to the inner tubes (meaning higher angular factor with the end wall). A higher exposure to hot walls means that the end walls tubes will receive more radiative heat.

In the meantime, considering that a tube tends to cool down its surroundings, two adjacent symmetry tubes are not as close to each other than two adjacent inner tubes, therefore they are surrounded by more substantial volumes of hot combustion gases than inner tubes; a wall end tubes has in its vicinity only one inner tube which is colder that the combustion gases. Therefore, the symmetry end tubes and the wall end tubes receive more convective and radiative heat from the surrounding hot combustion gases than the inner tubes.

To illustrate this phenomenon of non homogeneity of the heat transfer, numerical simulations have been made using a 3-D Computational Fluid Dynamic (CFD) solver intended for calculation of the heat transfer between the combustion chamber and the tubular catalytic reactors.

With this aim, top fired SMR furnace representative bays are defined; the "representative bays" defined have to be representative sections as defined above—that is sections which, when associated, will represent the furnace; they also have to take into account the presence of the walls or of the symmetry planes. The modular standard reformer would then be composed by assembling representative bays to achieve the desired plant capacity.

Depending on the number of tubes and burners in the rows and/or additional geometrical constraints, different type of "representative bays" can exist with various numbers of burners and tubes. However, it is to be noted that the invention applies to all types of sections in terms of number of burners, number of tubes and in terms of end of the section (end wall or symmetry between sections).

Figure 4:
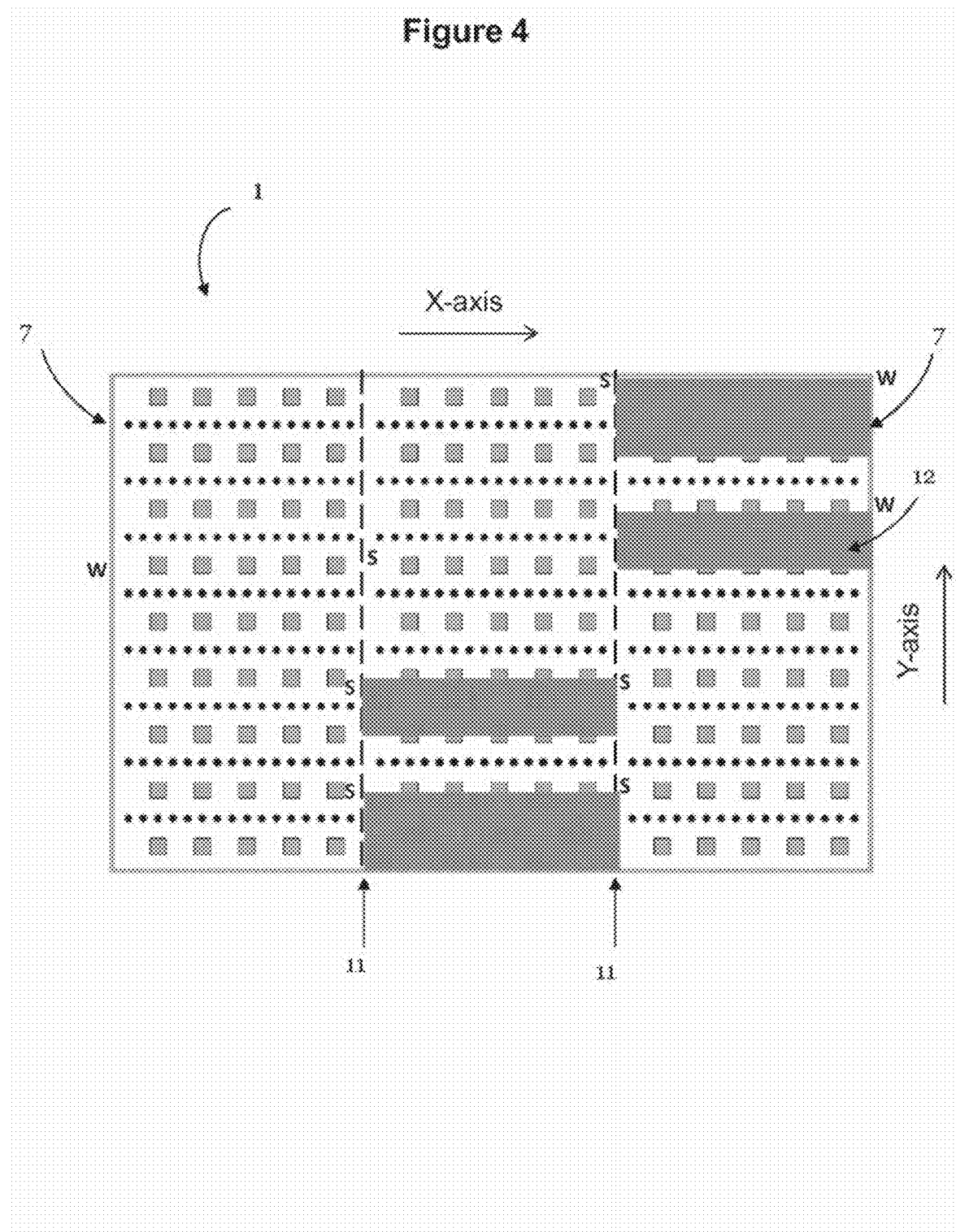
FIG. 4 shows a top view of the same furnace highlighting "representative bays" at the furnace scale.

Different representative bays are shown on FIG. 4.

Figure 5:
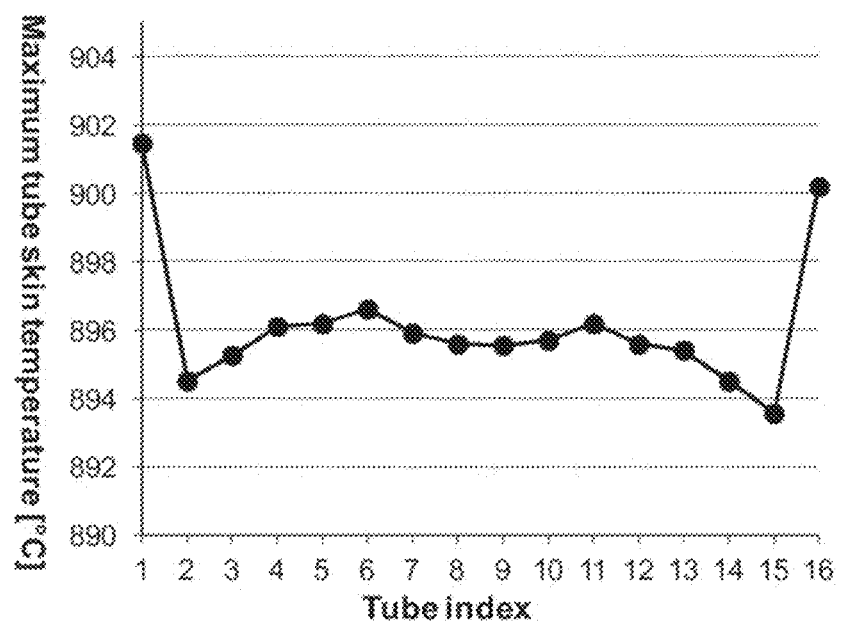
FIG. 5 shows the maximum tube skin temperature profile for the 16 tubes of a chosen "representative bay" ended by walls on both sides.

FIG. 5 presents the maximum tube temperature for the 16 tubes of a representative of FIG. 4.

The overheating of the outer tubes is highlighted. The representative bay is composed of a subset of sixteen tubes, heated by two rows of five burners of same power, ended by end walls on both end. The figure shows that the presence of an end wall induces an inhomogeneous heat transfer to the reforming tubes; the wall end tubes of the representative bay reach a higher skin-temperature than the inner tubes as shown by the 3-D CFD results. In the case presented, the difference between the maximum skin temperature value for the wall end tubes and the average of the maximum skin temperature value for the inner tubes within the representative bay is around 5° C.

There is, therefore, a problem of lack of homogeneity in the heating along a tube row that does not come from the burners arrangement and the invention aims at solving this problem so as to improve the heat flux homogeneity in top fired SMR (and bottom fired as well) by limiting the overheating of the outer tubes (wall end tubes and symmetry end tubes as well).

Figure 6:
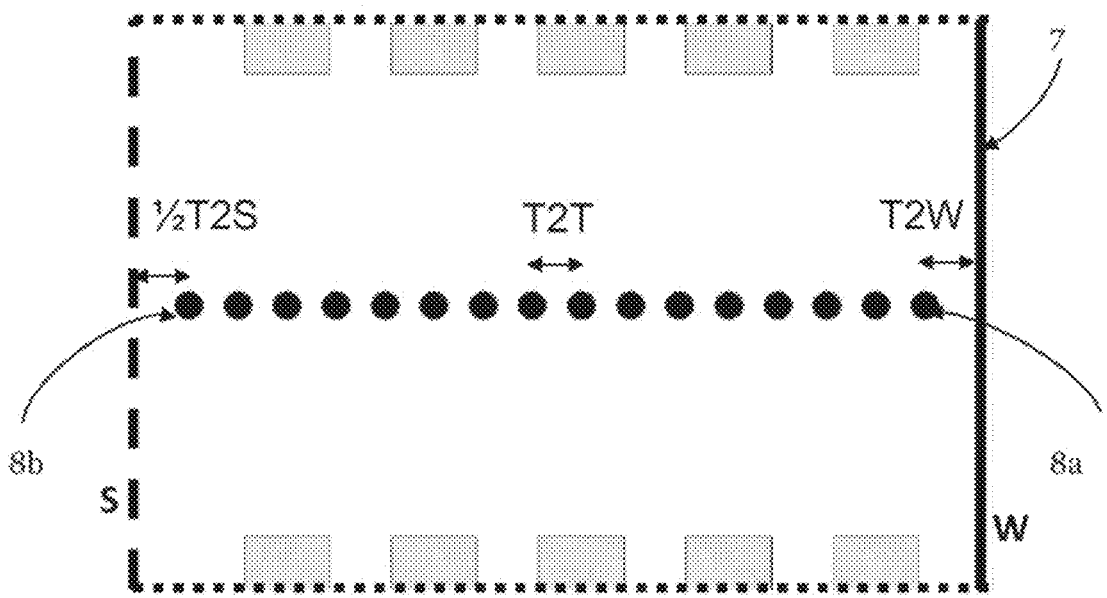
FIG. 6 shows the key parameters—according to the invention—for the repartition of the tubes in a representative bay with 16 aligned tubes flanked by 2 rows of 5 half burners, one end being end wall, and the second end being the symmetry plane.

The inventors have found that the way the tubes are arranged in a row, several distances between tubes, end walls and symmetry planes, and more exactly some specific distance ratios are very important to avoid uneven heat up of tubes. The distances of interest are presented on FIG. 6; this figure shows one of the representative bay of FIG. 4 with sixteen aligned tubes flanked by two rows of five burners, with one end being a wall and the second being the symmetry plane. On the figure are also indicated the distances that have been found to be key parameters, which are the following:

T2T is the distance between two adjacent tubes in the bay;
T2W is the distance between the wall end tube and the end wall;
T2S is the distance in-between two symmetry end tubes, thus twice the distance between the tube close to the symmetry plane and the symmetry plane (between two adjacent bays).

The ratios that the inventors consider as decisive are T2T/T2S and T2T/T2W.

It is an aim of the present invention to mitigate the heat distribution among the tubes within a row.

It is a further aim of the invention to reduce the temperature differences between the outer tubes and the inner tubes.

Figure 1:
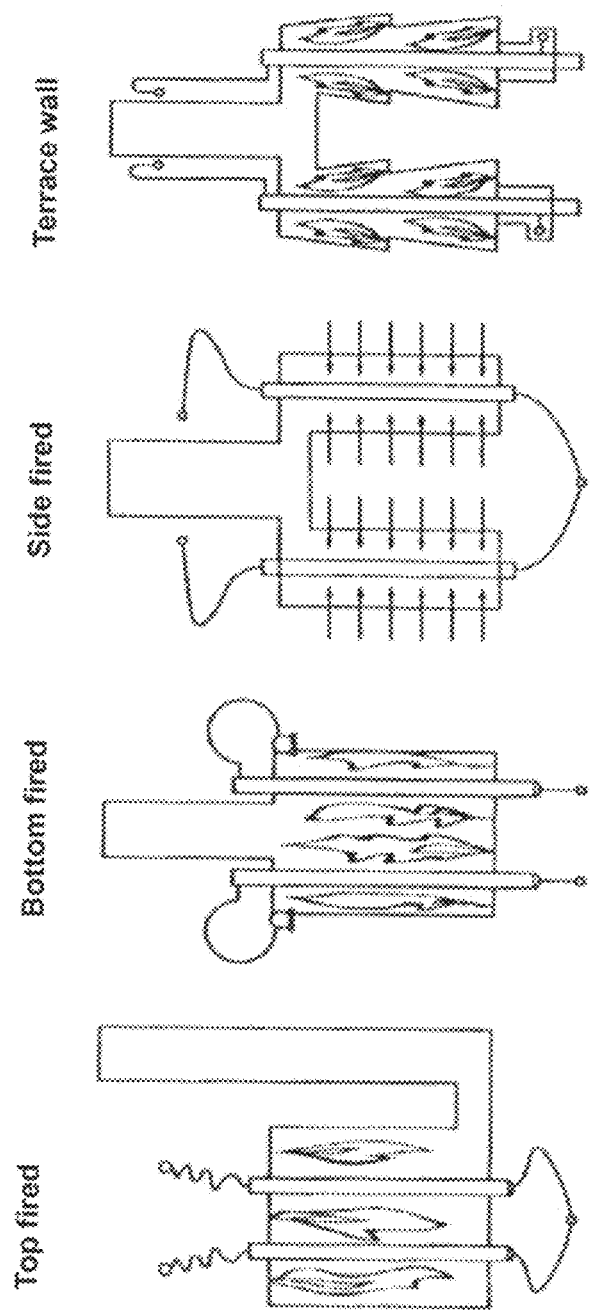
FIG. 1 shows the burners configuration for typical furnace designs.

As stated above, the invention aims at proposing an improved design of a furnace of top fired or bottom fired type—as illustrated on FIG. 1—for performing an endothermic process. The objective is to mitigate the temperature variations along a row of tubes, parallel to X-axis, thanks to an improved repartition of the tubes along said row.

In order to be able to identify and propose the best arrangements of tubes along a row, numerical simulations have been performed for different values T2T, T2W and T2S for several SMR plants.

The tool used to identify the best repartitions of the tubes in "representative bay" is the tool used here above for putting forward the differences in tube temperatures resulting from existing design.

The numerical simulations were made on top-fired SMR "representative bays" using a 3-D Computational Fluid Dynamic (CFD) solver intended for calculation of the heat transfer between the combustion chamber and the tubular catalytic reactors.

For a given furnace, representative bays are chosen; the "representative bays" defined would have to be representative of repeated sections, and also have to take into account the presence of the walls and also the voids between sections for furnaces with two sections or more. The modular standard reformer with the desired capacity would then be composed by assembling a suitable number of representative bays.

Reading the following more detailed description of the figures will help understanding the invention.

Figure 2:
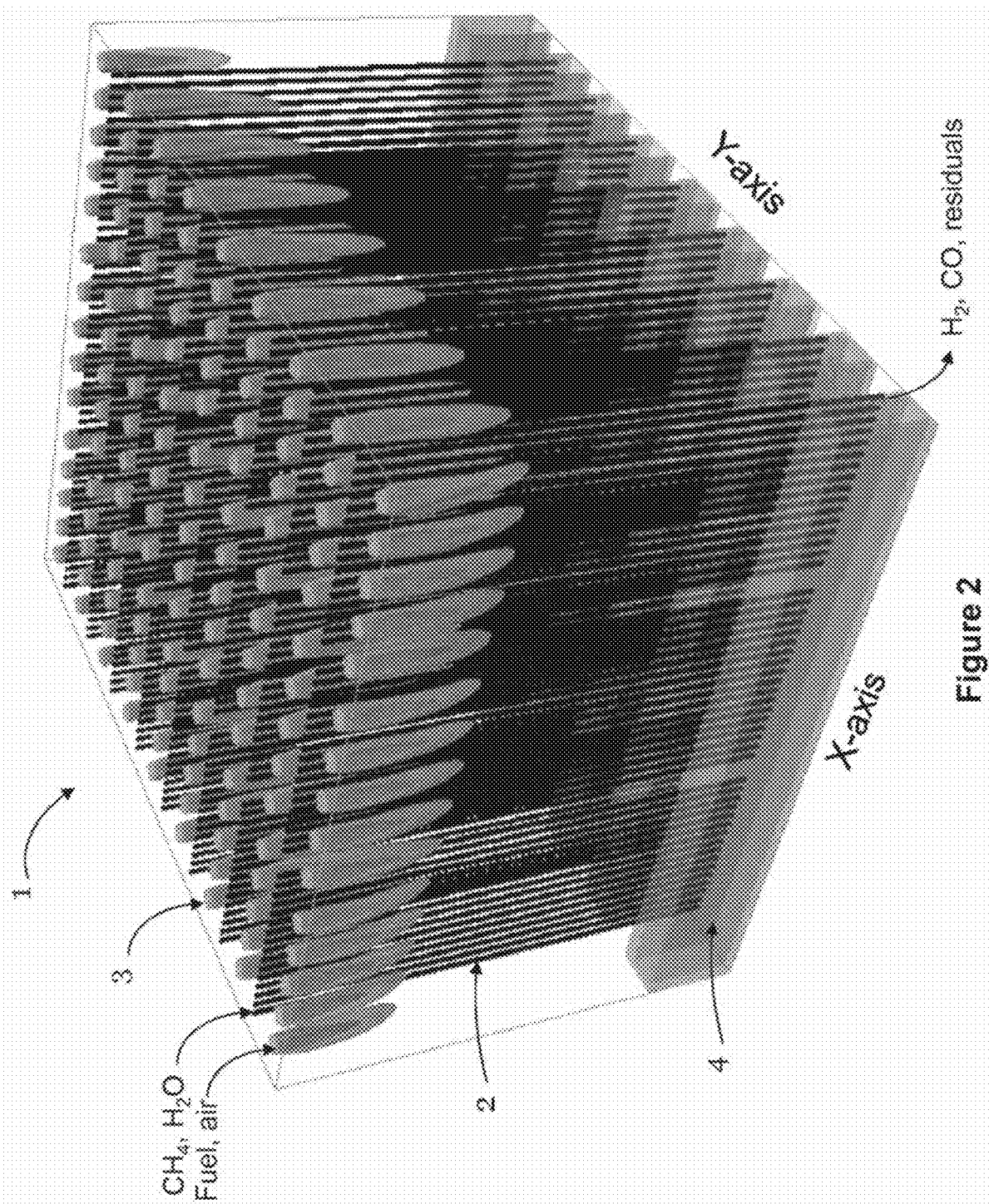
FIG. 2 shows a typical arrangement using a 3D representation of a top-fired furnace used for syngas synthesis.

FIG. 2 is a 3-D perspective view of a furnace; more exactly, it shows a typical arrangement of a top-fired furnace 1 used to produce a synthesis gas from a feed containing methane and steam. Catalyst tubes 2 are arranged in rows within the furnace 1. The feed is supplied through tubes 2, generally of 12 m high, from the top to the bottom; the synthesis gas produced containing hydrogen and carbon monoxide as major components, and residuals, is withdrawn from the bottom part of the tubes 2. Burners 3 are arranged in rows between the tubes rows and between tubes rows and the walls. Resulting flue gases are withdrawn through exhaust tunnels 4.

Figure 3:
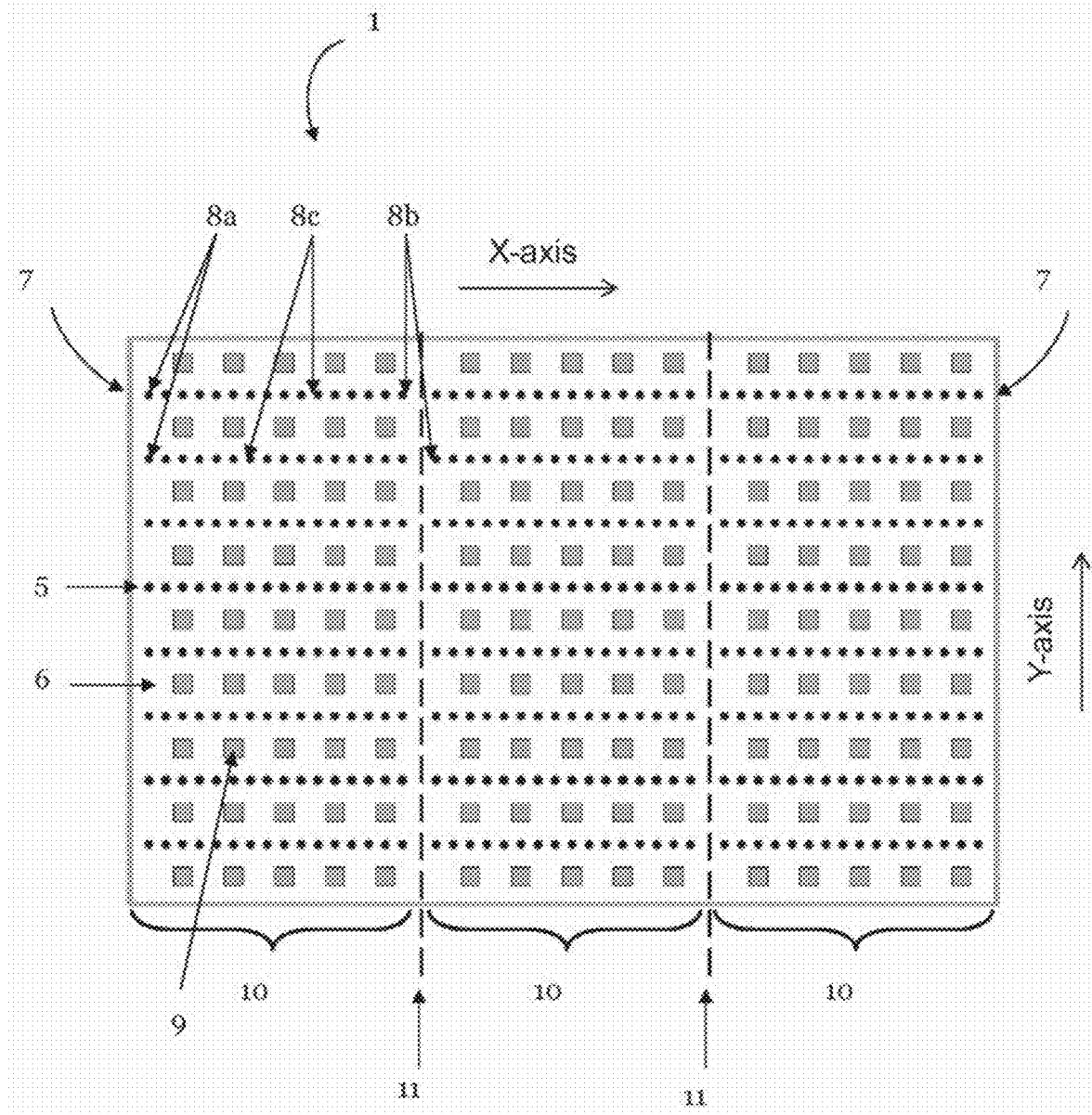
FIG. 3 shows a top view of a top-fired furnace, highlighting tubes and burners organization.

FIG. 3 presents a top view of a top-fired furnace 1 with 8 rows 5 of 48 tubes each, the rows being arranged in 3 sections 10 of 16 tubes each—and 9 rows 6 of 15 burners 9, parallel to the tubes rows, and arranged in the same 3 sections 10 of 5 burners each. The rows 5 of tubes are ended by a wall 7 (walls along Y axis also identified as "end walls"). For all rows 5 of tubes, the end tubes 8a facing the wall 7 are identified as "wall end tubes". Within the row, the wall end tubes are surrounded by a wall 7 on one side and by a tube on the opposite side. Within the row, the inner section tubes 8c are surrounded by two tubes, one on each side. The endothermic reforming reaction takes place in the tubes and therefore the tubes skin surface is colder than the refractory walls and the combustion gases. The presence of the end wall and hotter combustion gases may lead to an overheating of the end tubes burners.

As already stated, an important number of tubes and burners makes it necessary to add support beams to ensure safety of the furnace; said supports divide the rows in several parts (known as sections or known as bays 10). The sections 10 end either by a wall 7 or by a symmetry plane 11 separating two adjacent sections. The end tubes 8b closest to the symmetry planes 11 are identified as "symmetry end tubes". The distance or gap between two symmetry end tubes 8b of two adjacent bays is more important than the distance between two tubes in the same bay, and consequently a higher view factor with the furnace end walls than inner section tubes and also a higher volumes of hot combustion gases surrounding them, leading to an overheat when compared with inner tubes 8c.

FIG. 4 shows a top view of the furnace highlighting "representative bays" at the furnace scale—see grey rectangles. As an example the "representative bay" 12 is composed of a subset of 16 aligned tubes, heated by 2 rows of 5 burners of same power, one end W being representative of end wall 7, and the second end S being representative of the symmetry plane 11—in the middle of the void (gap) between 2 adjacent sections.

FIG. 5 presents the profile of the maximum tube temperature calculated thanks to the 3-D CFD model for a representative bay with 16 tubes and 5 burners ending by walls one on each end with T2T=0.35 m, T2W=0.52 M, T2T/T2W=0.67. This clearly illustrates that the heat transfer to the tubes is not homogeneous. A higher skin-temperature is observed for the outer tubes compared to inner tubes; the temperature difference reaches 5° C.

As stated above, the invention aims at controlling the heat flux inhomogeneities in a representative bay so as to consequently control the heat flux all along the row, and finally to improve the heat flux control in the whole furnace. To achieve this result, the invention aims at limiting the heat transferred to the outer tubes thanks to an improved tubes arrangement design along rows.

In order to optimize the arrangements of the tubes, numerical simulations of the behavior of different SMR plants have been performed.

The representative bay 12 will be used to display the important specific distances intended to describe the invention. As already stated, the arrangement of the tubes along a row can be defined by the three distances T2T, T2W and T2S. Identified on FIG. 6, the distances correspond to the following:

T2T is the distance between two adjacent tubes in the representative bay;

T2W is the distance between the end wall 7 and the wall end tube 8a in the representative bay;

T2S is the distance in-between two symmetry end tubes.

The three distances identified above are of great importance and representative of the row, more precisely in the form of the two ratios T2T/T2S and T2T/T2W.

Remark: a bay can be characterized by a pair of the following ratios:
- (T2T/T2W and T2T/T2S) for a bay close to an end wall 7 on one side and a symmetry plane on the other side
- (T2T/T2S and T2T/T2S) for a middle section with symmetry planes 11 on both ends
- (T2T/T2W and T2T/T2W) for a section with end walls 7 on both ends in the case of a small reformer with only one section. This configuration will be used for the simulations presented hereafter and for the figures in relation with the simulations intended to describe the invention.

The figures that follow present the different repartitions of the tubes to which simulations have been applied and the results obtained.

Figure 7:
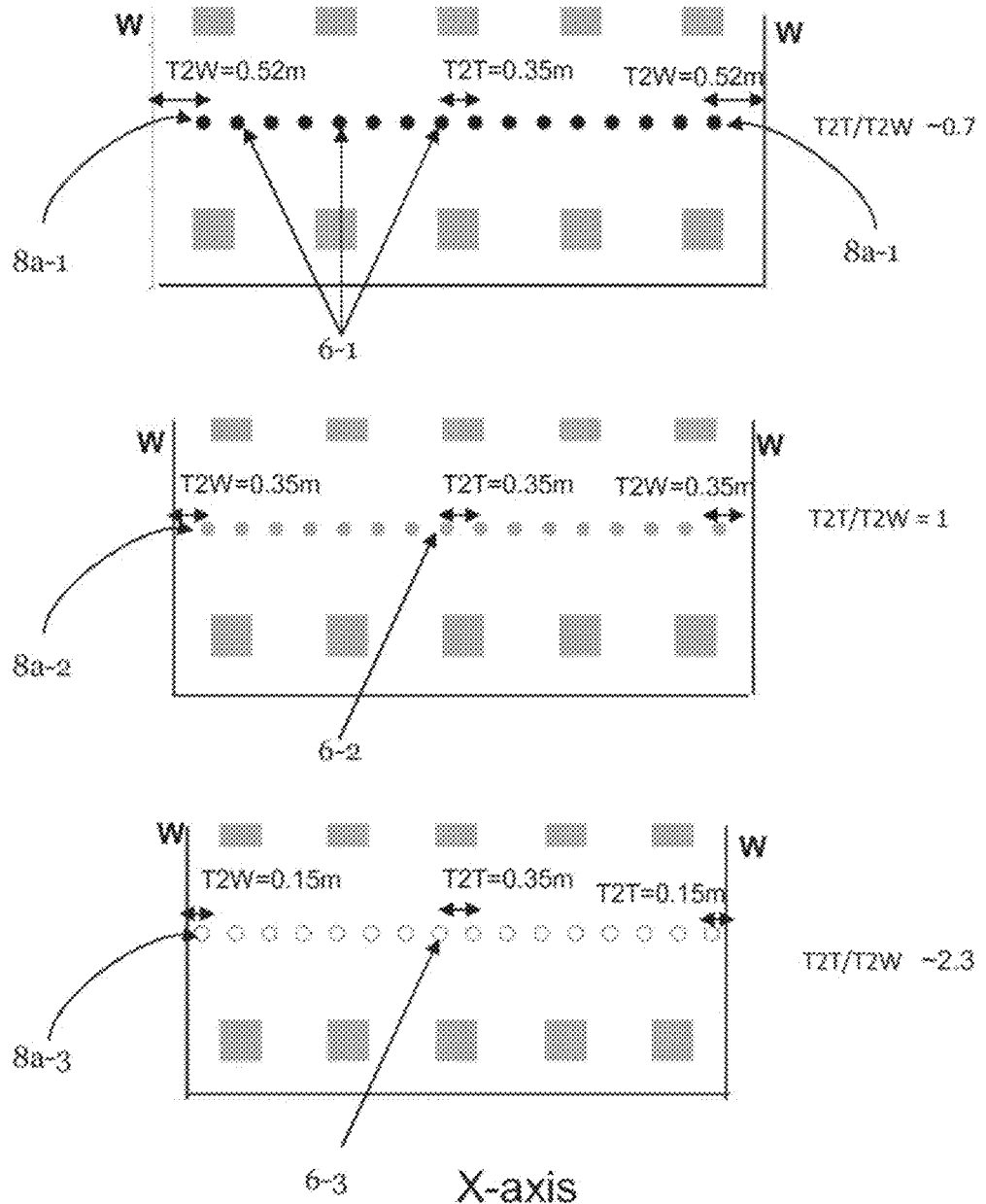
FIG. 7 presents 3 different repartitions of the tubes in the representative bay of FIG. 5 with 16 tubes aligned in one row and flanked by 2 rows of 5 half burners ended by walls on both sides.

FIG. 7 shows 3 different repartitions of the 16 tubes of the bay of FIG. 5 characterized by the ratios (T2T/T2W and T2T/T2W) which were kept the same; for each case, the ratios T2T/T2W are indicated and the tubes are represented as black circle, grey circle or white circle according to the repartition. The wall end tubes 8a-1, 8a-2 and 8a-3 are situated at different distances from the end wall. The inner tubes 6-1, 6-2 and 6-3 have the same gap in-between them and also with the wall end tubes. The same shapes will be used to differentiate the 3 cases in the following related figures. For the three cases, the repartition of the 5 burners was established to assure similar flow patterns according to EP 15307007.3.

Figure 8:
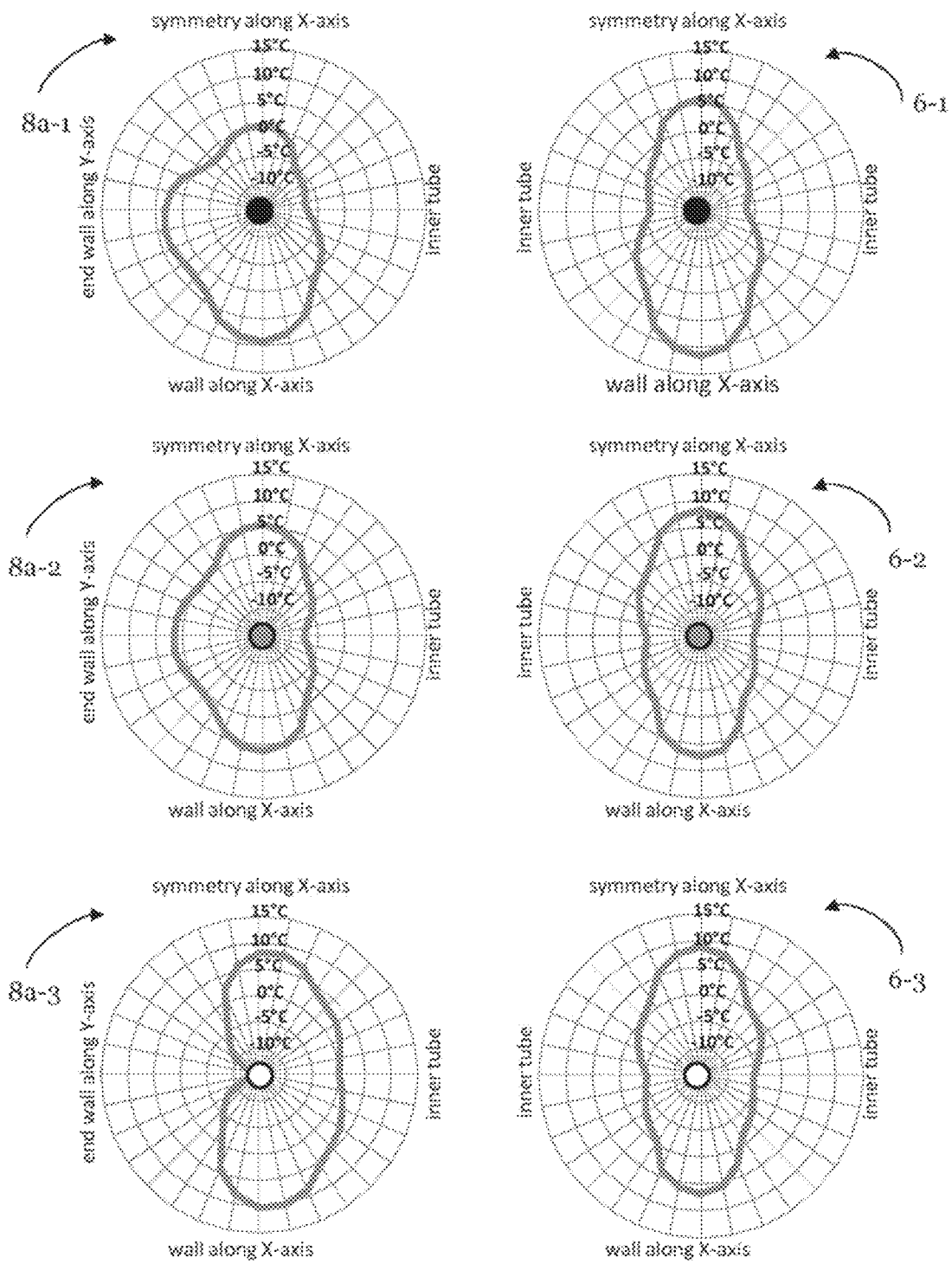
FIG. 8 illustrates the difference between the tube circumferential temperature at 6 m height (the tube having 12 m height) and the average temperature at the same height for an inner and an outer tube for the 3 cases presented on FIG. 7.

FIG. 8 shows for the same 3 cases the difference between the tube circumferential temperature at 6m height and the average tube temperature at the same height. For each case are shown a wall end tube and a inner tube: 8a-1 and 6-1, 8a-2 and 6-2, and finally outer tube 8a-3 and inner tube 6-3.

The results of the numerical simulation highlight that the wall end tubes will be more or less heated depending on the repartition of the tubes. When the distance between the wall and the end tube is superior to the tube pitch (distance between two inner tubes), the wall end tube is overheated, effect observed for the black circle referenced case with T2T/T2W~0.7. The temperature circumferential profile for the wall end tube which is the closest to an inner tube corresponds to the grey circle referenced case with the ratios T2T/T2W=1 (i.e. the distance between the wall end tube and the closest end wall is equal to the distance in-between tubes). For the white circle reference case, the wall end tube was too close to the end wall, which leads to an under heating of the tube angular sector facing the end wall. When the wall end tube is too close to the wall, it will obstruct the heat transfer from the hot gases. Therefore, the strip of the wall situated in the shadow of the tube will emit less radiative flux compared to the other wall regions.

Figure 9:
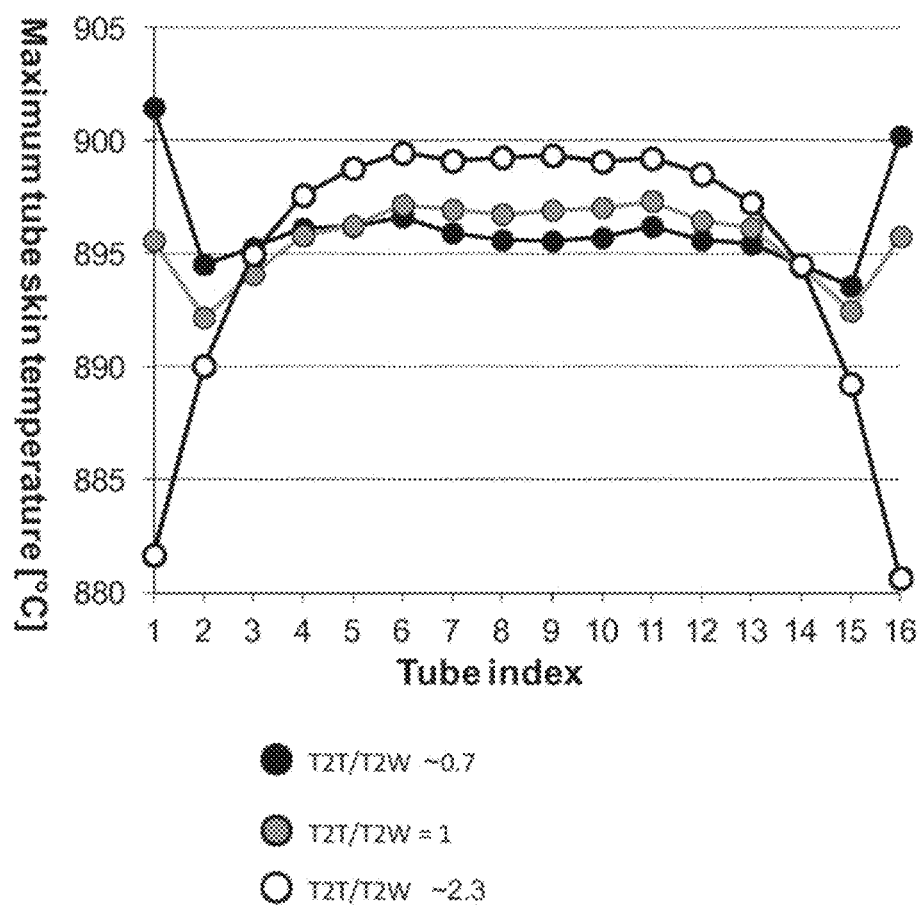
FIG. 9 shows the maximum tube skin temperatures for the 16 tubes of the representative bay for the same 3 cases of FIG. 8.

FIG. 9 shows the maximum tube skin temperature profile for the same 3 cases and confirms the observations made on the tube circumferential profile: grey circle referenced tubes temperature profile is the more uniform and regular with a temperature spread between the hottest and coldest tube of around 5° C., while black circle referenced case leads to a tubes temperature spread of around 8° C., and white circle referenced tubes temperature profile presents a sever under heating of the wall end tube leading to the highest temperature spread of around 19° C. To retrieve general design rules, a parametric study was performed on 10 examples of reference bays with different values for the T2T, T2S and T2W distances. This study allowed identifying the best ratios T2T/T2W and T2T/T2S and therefore to define the best design rules, and also to estimate the gain in term of temperature homogenization among the tubes.

FIG. 10 presents a table with the impact of the tube arrangement on the percentage of tube duty (heat transferred to the tube) of an outer tube with respect to the duty of the closest inner tube within different reference bays. The relative duty of an outer tube with respect to inner tubes duty will quantify the amount of heat received by an outer tube with respect to an inner one.

As the main objective of the invention is to solve the problem of non-uniformity of the temperatures along a row of tubes, this means that the best examples are the ones that give a relative duty value as low as possible; in the examples shown the highest relative duty values are around 3%, while the lower are close to −3%. A relative duty close to 0% indicates that inner and outer tubes have similar temperatures while a high relative duty close to 3%, or more indicates that the outer tube is overheated and a low relative duty close to −3%, or less indicates that the outer tube is under heated. Thus, the closer to 0% the relative duty in a bay, the higher the performances of a steam methane reformer is.

The tube ratio rules that were retrieved are:
in order to have a relative duty value in the interval −2% to 2%, the ratios T2T/T2W and T2T/T2S should be greater than 0.5 and smaller than 2.
if the ratios T2T/T2W and T2T/T2S are greater than 0.75 and smaller than 1.25 the expected relative duty value will be in the interval −1% to 1%.

Finally, the ratios rule has mainly no dependency on the number of tubes (neither on the number of burners) in the representative bays.

The above results put forward design rules that need to be applied to the arrangement of the tubes all along the rows in order to obtain more regular tubes temperatures all along the rows.

The observance of the above rules will contribute to prevent tubes overheating and failure, replacement of tubes and shutdowns will therefore decrease.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A furnace for performing an endothermic process, the furnace comprising:
tubes containing a catalyst for converting a gaseous feed, wherein the tubes are positioned in rows inside the furnace;
burners mounted in the furnace and positioned between the rows of tubes and between the tubes and furnace walls, wherein the furnace walls are parallel to the rows of tubes,
wherein the rows of burners and rows of tubes are ended by end walls and are divided into sections with, on each row of tubes, the distance from a wall end tube to the end wall being T2W, the distance between two adjacent inner tubes in a common section being T2T, and the distance between two symmetry end tubes of two adjacent sections being T2S,
wherein the tubes are configured in such a way that a ratio of T2T/T2W and a ratio of T2T/T2S are greater than 0.5 and less than 2 thereby limiting the differences in heat transfer to a plurality of outer tubes with respect to a plurality of inner tubes and reducing the temperature difference between the plurality of outer tubes and the plurality of inner tubes,
wherein the plurality of outer tubes are the wall end tubes and the symmetry end tubes, wherein the plurality of inner tubes comprise the tubes that are not outer tubes.

2. The furnace according to claim 1, wherein T2T/T2W and T2T/T2S are greater than 0.75 and less than 1.75.

3. The furnace according to claim 1, wherein T2T/T2W and T2T/T2S are equal.

4. The furnace according to claim 1, wherein the burners are mounted to the furnace roof.

5. The furnace according to claim 1, wherein the burners are mounted to the floor of the furnace and fire vertically upwards.

6. The furnace according to claim 1, wherein the furnace is configured for use in a steam methane reformer.

7. An endothermic process to be performed in a furnace comprising tubes and burners, said process comprising:
   a. providing the furnace as claimed in claim 1;
   b. combusting fuel with air in the burners;
   c. introducing a gaseous feed and steam into the tubes under conditions effective for converting the gaseous feed and steam into products; and
   d. discharging the product stream generated in the tubes.

8. The process according to claim 7, wherein the endothermic process is steam methane reforming.

9. The process according to claim 7, wherein the ratios T2T/T2W and T2T/T2S are greater than 0.75 and less than 1.75.

10. The process according to claim 7, wherein the ratios T2T /T2W and T2T/T2S are equal.

11. The process according to claim 7, wherein the furnace is a top fired furnace.

12. The process according to claim 7, wherein the furnace is a bottom fired furnace.

13. The process according to claim 7, wherein the furnace further comprises at least one roof beam running orthogonal to the furnace walls, wherein the at least one roof beam divides each row of burners and each row of tubes into the sections.

\* \* \* \* \*